INVENTORS
NOEL M. RUST AND
JOHN F. RAMSAY
BY
ATTORNEY

March 12, 1957  N. M. RUST ET AL  2,785,397
ANNULAR LENS ANTENNA
Original Filed Sept. 9, 1947  3 Sheets-Sheet 3

INVENTORS
NOEL M. RUST AND
JOHN F. RAMSAY
BY
ATTORNEY

United States Patent Office 2,785,397
Patented Mar. 12, 1957

2,785,397
ANNULAR LENS ANTENNA

Noel Meyer Rust and John Forrest Ramsay, Chelmsford, England, assignors, by mesne assignments, to Radio Corporation of America, New York, N. Y., a corporation of Delaware Application January 2, 1951, Serial No. 214,450, now Patent No. 2,764,757, dated September 25, 1956, which is a division of application Serial No. 772,960, September 9, 1947, now Patent No. 2,650,985, dated September 1, 1953. Divided and this application April 1, 1955, Serial No. 502,062

14 Claims. (Cl. 343—753)

This invention relates to radio horns, that is to say horn-like devices for directing very high frequency radio energy. Radio horns have a considerable field of application e. g. to communication systems, navigation aiding systems (especially for aircraft use) and radar systems.

This application is a division of co-pending U. S. application Serial No. 214,450, filed January 2, 1951, by the same joint applicants as the present application, which in turn is a division of original U. S. application Serial No. 772,960, filed September 9, 1947, by the same joint applicants of the present application. The said original application issued on September 1, 1953 as Patent No. 2,650,985. The co-pending application issued on September 25, 1956, as Patent No. 2,764,757.

One of the difficulties encountered in the use of horns whether fed by wave guides or other means is that the lengths of the paths from the small end or "virtual apex" of the horn to different points in the plane of its aperture are different with the result that the field is not uniform in phase over the said plane and, in general, uniformity of phase of field over the aperture is necessary to efficient radiation. In the case of a horn of wide aperture in relation to the wave length, and of length comparable to the aperture, this defect becomes serious, being very detrimental to the directivity of the horn, and imposes serious constructional limitations since if a good standard of directivity is to be maintained the horn must be made of great length which results either in excessive bulk or expensive and complicated folding. The present invention seeks to reduce or avoid this defect and the limitations resulting therefrom.

The invention is based upon the fact that the phase of field in a space bounded on at least two sides by conductive walls placed parallel to the electric field and not less than half a wave length apart progresses at a velocity greater than the velocity in free space, this increase in velocity resulting from the interaction of waves reflected from the boundary walls. This field velocity or phase velocity may be controlled by controlling the spacing of the boundary walls, this spacing being, of course, always not less than a half wave length.

The present invention is based upon the above mentioned physical phenomenon and consists in its main feature in utilising the said phenomenon to compensate for the effect of different path lengths between apex and aperture of a horn so as to ensure that despite different path lengths there is a pre-determined phase distribution which is usually required to be uniformity of phase— over the said aperture. The simplest and most common case is that in which the aperture lies in a geometrical, i. e. a flat plane, but the invention is not limited to this case and may be employed in cases in which the aperture lies on a curved surface e. g. a cylindrical surface. Again the aperture need not actually be across the mouth of a horn proper; as will be seen later it may be across the mouth of an attachment to a horn, the attachment being then regardable as part of a horn structure consisting of the horn proper and the attachment.

According to the main feature of this invention a radio horn structure comprises means for differently modifying the velocity of propagation over different paths from apex to aperture so as to compensate or correct to a desired degree for the effects of the different lengths of said paths on phase distribution across said aperture.

The invention is illustrated in and further explained in connection with the accompanying drawings.

There are various methods by which the invention may be carried into effect and these methods may be used either singly or in conjunction.

One method is to provide horn partition plates of pre-determined shape, extent and disposition which in effect divide up the horn into wave guide sections so dimensioned as to produce increase of velocity (as compared to the velocity in free space) so as to compensate for different path lengths in the horn and give uniformity of phase across the aperture.

Another method is to provide a horn with an attachment whose inner space is subdivided by suitably shaped and disposed plates into what are in effect wave guides which produce velocity changes such that uniformity of phase is obtained at the aperture of the attachment.

A third method consists in constricting the horn by giving it what may be termed delayed flaring up or advanced flaring down, that is to say, flaring up or down so as to produce required velocity changes to compensate for different path lengths.

The invention will be described in greater detail by reference to the following description taken in connection with the accompanying drawing wherein similar reference letters refer to similar elements and in which.

Figure 1:
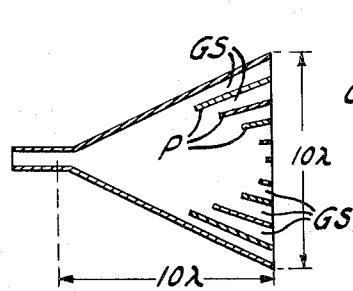
Figures 1 and 2 are cross-sectional and end views respectively of an embodiment of the invention including a wave-guide horn flared in one dimension only.
Figure 2:
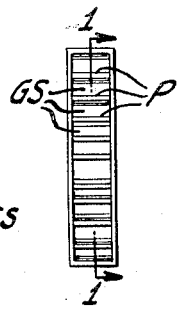

Referring to Figures 1 and 2 which show in diagrammatic section and end view respectively one embodiment of the invention as applied to a horn flared out in one plane only for use with waves with polarisation perpendicular to the plane of flaring, the horn is divided into what are in effect a series of wave guide sections GS by means of plates P at right-angles to the parallel walls of the horn the plates being radial as viewed in a direction perpendicular to said parallel walls (re as viewed in Figure 1) so that the plates all point from the mouth of the horn towards the apex. The plates nearest the flared walls are longest and diminish in length towards the centre of the horn so that the velocity increase in the outermost wave guide sections is greater than that in the more inward sections whereby the greater lengths of the outer paths from apex to aperture are compensated. Typical practical dimensions in terms of the wave length (2) are indicated in Figure 1.

Figure 3:
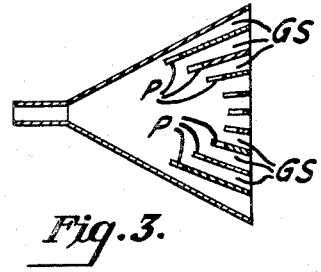
Figure 3 is a cross-sectional view of an embodiment of the invention wherein the horn is flared in two dimensions.
Figure 4:
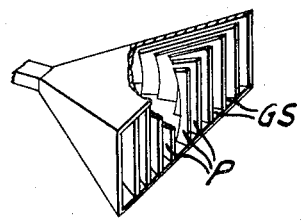
Figure 4 is a partially cut-away, perspective view of the embodiment of Figure 3.

The principle embodied in the construction just described may be extended as shown in Figures 3 and 4 to a horn which is flared in both planes. Figure 3 is a diagrammatic axial section and Figure 4 a perspective view. As will be seen the sub-dividing plates are not only of varied length but their inner edges are curved (see Figure 4) whereas in the case of Figures 1 and 2 for a horn flared in one plane only the ends of the sub-dividing plates may be simply straight.

Figure 5:
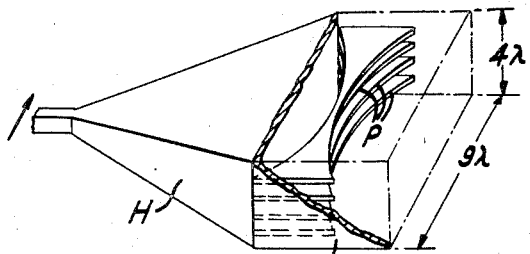
Figure 5 is a partially cut-away, perspective view of an embodiment of the invention including a horn extension with a bi-concave electromagnetic lens positioned therein.
Figure 11:
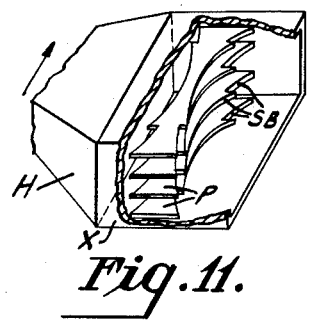
Figure 11 is a partially cut-away, perspective view of an embodiment of the invention employing stepped-back lens plates.

In another class of embodiment, instead of providing path length correcting velocity increasing plates in the flared part of the horn, a straight rectangular horn extension may be provided and suitably shaped and disposed sub-dividing plates mounted across the extension so that although there will not be uniformity of phase where the energy enters the extension there will be the desired uniformity across what is now the effective aperture of the whole horn structure (comprising horn proper and extension) i. e. where the energy leaves the extension. Plates subdividing such an extension into wave guide sections may be simple rectangular plates of different sizes or they may be plates with inner curved edges. Figure 5 is an embodiment of this nature, the horn proper being indicated at H and the extension at X, the plates curved on both edges, being shown at P. Figure 11 illustrates an alternative embodiment, this one employing stepped-back double concave electromagnetic lens plates. The particular arrangement in any case will depend upon design requirements and the plates will be horizontally or vertically disposed in dependence upon the plane of polarisation.

Figure 6:
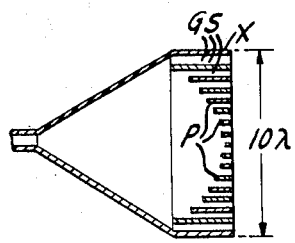
Figures 6–9 are cross-sectional views of various electromagnetic lens arrangements according to the invention.
Figure 7:
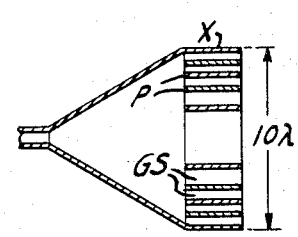
Figure 8:
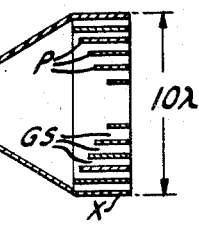

For all embodiments in accordance with this invention the partition plates may be of uniform spacing with their lengths varied or they may be of uniform length with their spacing varied or both spacing and length may be varied to provide the required compensation. These three possibilities are indicated in Figures 6 to 8, Figure 6 showing constant spacing and varied length, Figure 7 showing varied spacing and constant length and Figure 8 showing both length and spacing varied. Again the spacing of the plates may, if desired, be varied over the individual lengths of the wave guide sections formed thereby. Where both length and spacing are varied the design may be and preferably is such that each wave guide section is an integral number of half wave lengths long, i. e. an integral number of half wave lengths in the wave guide. This design expendient has the advantage of facilitating matching the impedance of the horn to the impedance of a feeding wave guide.

Figure 9:
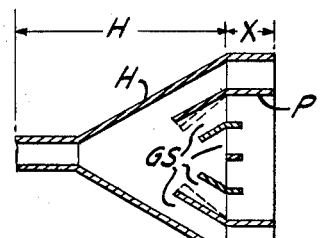

The methods of carrying out the invention which consist in providing partition walls in a horn or in an extension to the horn may be employed in combination. For example, a horn structure may comprise as shown in Figure 9 a horn proper H and a parallel sided box like extension X with partition plates P shaped and dimensioned to produce the required compensation for different path lengths arranged in the extension member and also extending into the horn proper. In the case shown the partition plates P are angularly bent where they pass from the horn proper H into the extension X, parts of the plates lying parallel to the extension axis and parts lying parallel to the flared sides of the horn proper as shown. The plates P may be bent over as indicated and by suitable adjusting the angles of bending of the individual plates a degree of control of the amplitudes of the energies entering the individual wave guide sections GS and a degree of control of the amplitude distribution across the horn thereby obtained. This is indicated in Fig. 9 by showing alternative angles of bending for two of the plates in broken lines.

Figure 10:
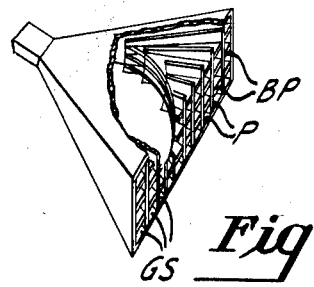
Figure 10 is a partially cut-away, perspective view of an alternative embodiment of the invention similar to the one shown in Figure 4.

This arrangement of partition plates parallel to the walls of a horn or extension, through probably the simplest to design is not essential for it will be apparent from a consideration of first principles that other arrangements can be utilised since the wave guide sections into which a horn proper and/or an extension is or are divided in carrying out this invention need not be of uniform cross section nor such as to provide a constant velocity of propagation along their lengths. The requirement of the invention is that the modification of velocity of propagation produced by the subdivision into what are in effect wave guide sections shall be such as to compensate, as regards phase distribution across a flat or curved surface constituting the aperture for different lengths of path between the feeder wave guide or line and the aperture and so far as fundamental considerations are concerned it is of secondary importance whether the velocity modification if effected uniformly or not.

Where it is desired to produce a horn of wide aperture in the E plane (electric plane) but narrow aperture in the H plane (magnetic plane) the opposite to delayed flaring may be used, i. e. the narrowing down from feeder wave guide dimension to the required narrow aperture dimension may be carried out earlier for the outer paths than for the inner and central paths, the design being again such as to produce a substantially equi-phase aperture. In order to avoid defects due to the ray paths being bent by refraction it is desirable, and in some cases may be found essential, to provide suitably disposed metal plates normal to the direction of the electric field at the entrance to the phase correcting part of the horn and extending along this part in such a way as to guide the wave elements. These plates should not be confused with those which divide a horn with wave guide sections, for the latter are parallel to the electric field and therefore at right angles to the former. Again such metal plates which extend normal to the electric field and to the extension of the velocity modifying plates and which may be termed baffles may be provided in other constructions in accordance with this invention, e. g. in a horn extension, the baffles, in conjunction with the velocity modifying plates then resulting in a honeycomb like or cellular structure. An arrangement of this type is shown at BP in Figure 10. It is understood that any other of the arrangements may likewise be provided with baffle plates.

Figure 12:
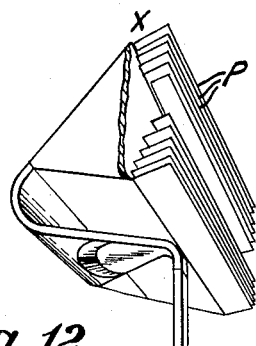
Figures 12 and 12a are perspective and plan views, respectively, of an electromagnetic lens mounted in the extension of a folded horn.
Figure 12A:
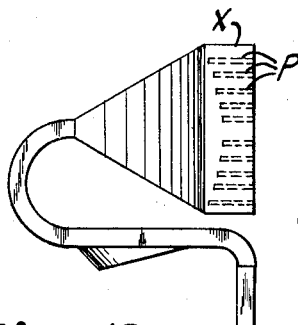

The expedients of velocity modification by delayed flaring up or flaring down; by constriction; and by partition plates sub-dividing the horn plates into wave guide sections may be adopted in any desired combination each of the expedients adopted contributing its quota to the total velocity modification introduced. Further the methods of the invention are not limited to their application to straight horns for obviously they may be employed also for folded horns. Figures 12 and 12a show a folded horn with an extension X housing plates P. They are also very advantageous when applied to the construction of what may be termed "skew horns" or "part horns." This is a very important class of embodiment practically. In one embodiment of this class illustrated in the mutually perpendicular views of Figures 13 and 14 a "skew horn" or "part horn" H' is, in effect, a normally shaped horn which is cut away along a plane parallel to the axis— for example along a plane passing through the axis—and mounted on a flat surface (e. g. the ground G) with the plane of cutting on that surface. Thus where the cutting plane passes through the axis the result would be a half-horn resting on the flat surface.

Figure 13:
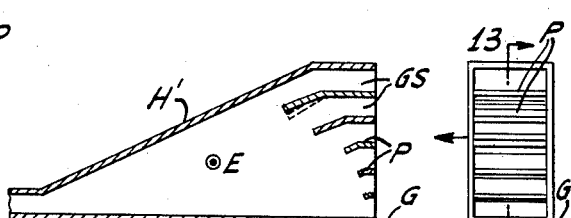
Figures 13 and 14 are respective cross-sectional and end views of an electromagnetic lens positioned in a skew horn.
Figure 14:
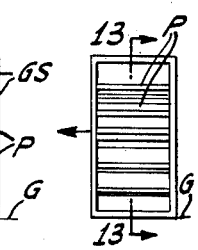
Figure 15:
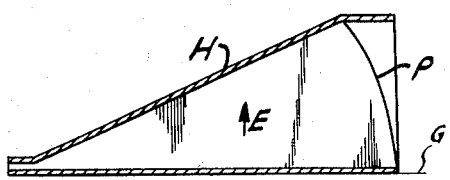
Figures 15 and 16 are respective cross-sectional and end views of an electromagnetic lens positioned in a skew horn: the lens and horn are of different types than the ones shown in Figures 13 and 14.
Figure 16:
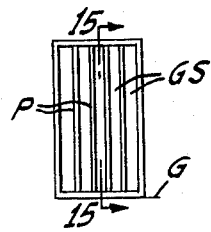

By means of partition plates P and/or flaring provided in accordance with this invention the phase distribution across the mouth of the half horn may be made such as to give a directional beam parallel to the axis although the horn is not geometrically symmetrical with respect to the axis. The plates P may be bent over and, as in Fig. 9 a degree of control of the amplitude distribution across the horn obtained by suitably adjusting the angles of bending (indicated in broken line for one plate). Figures 15 and 16 show another construction of this type for the case where the electric field is at right-angles to that for Figures 13 and 14. In Figures 13 and 15 the direction of the electric field is indicated conventionally at E. The great practical advantage of this type of construction is that the energy feeding apparatus at the "small end" of the horn may be brought at or near ground or building level—an advantage leading to great constructional convenience and economy.

Figure 17:
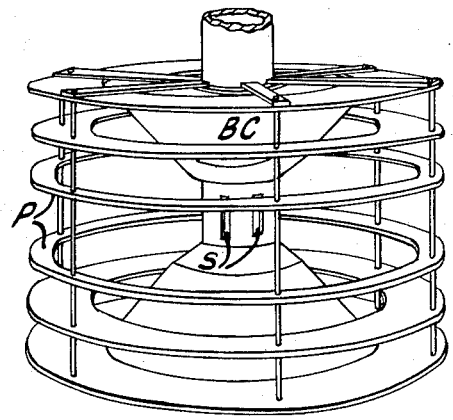
Figure 17 is a perspective view of a bi-cone antenna arrangement including an electromagnetic lens according to the invention.

The principles of the invention may be extended to so-called bi-cones which produce circular polar diagrams, in all horizontal planes and a relatively sharp beam in all vertical planes. For example in the case of a bi-cone exciting vertically polarised waves phase correction may be effected by vertical partition plates of suitable varying profile arranged radially round the periphery of the bi-cone structure. In the case of a bi-cone excited by bent dipoles or by loops to produce an all-round horizontally polarised field, phase correction may be effected in accordance with this feature of the invention by providing a plurality of parallel peripheral ring plates round the bi-cone structure and of different radial lengths, those nearest the centre being shorter than the outer ones. In the case of bi-cones with very large cylindrical apertures it is very convenient to omit the outer parts of the bi-cone. In such a case a suitable construction of partition plates may be provided at a little distance from the actual bi-cone orifice. One form of bi-cone structure in accordance with the invention is illustrated, in Figure 17 in which the bi-cone BC with energy radiating slots at S is provided with ring plates P.

In all cases in accordance with this invention in which the path differences to be corrected for exceed a wave length, that is to say in which the lengths of the paths for which correction is to be applied exceed the shortest path by one or more wave-lengths, it is necessary only to correct for such path differences in excess of a wave length or an integral number of wave lengths will clearly not introduce any phase change. In other words partition plates or other devices provided in carrying out this invention may be of stepped construction being stepped back at each point or points corresponding to a path difference of an integral number of wave-lengths as shown in Fig. 11. Further although the partition plates and other conducting surfaces have been specifically described as plates or surfaces of solid material it will be obvious to those skilled in the art that they may be perforated for lightness or to reduce windage or made of wires or gauze (as may be desired) for the same reasons and the term "plates" is intended to cover all such constructions.

Although the invention has been described with reference to the transmission of radio energy it will be apparent to those skilled in the art that the constructions described herein may also be used for reception if desired since a radio horn is in essence a reversible device.

Having now particularly described and ascertained the nature of our said invention and in what manner the same is to be performed, we declare that what we claim is:

1. A radio antenna system comprising waveguide transmission means including a pair of conductive conical surfaces arranged to define a waveguide having a centrally located throat portion adapted to be coupled to a radio frequency transducer and an aperture open to free space, and a plurality of annular plates arranged at said aperture to compensate for the effects of different path lengths within said passage on the phase distribution of the energy at said apex and said aperture.

2. An antenna comprising a central radiator or receptor for radio waves at an operating frequency and having a radiation pattern substantially non-directional about a predetermined axis, a stack of substantially parallel metallic plates surrounding and spaced from said radiator or receptor and spaced in the axial direction each from the next adjacent plate by more than a half free-space wavelength at the operating frequency, each said plate being disc-like with inner and outer edges each substantially a complete circle coaxial with said axis, the axial spacing between plates and the dimension of each plate radially from said inner to said outer edge being selected to cause a relative shift in phase between radio waves at the operating frequency polarized with the electric vector normal to said axis and thus parallel to said plates and propagated radially between one pair of adjacent plates and those similarly polarized and similarly propagated between an adjacent pair of plates, said shift in phase at plates centrally located along said axis being progressively less than and in retardation of those more remote from said central plates, whereby the said antenna is non-directional in a plane normal to said axis, and the directivity in a plane through said axis is increased over that of said central radiator or receptor.

3. The antenna claimed in claim 2, said outer edges all having the same radii.

4. The antenna claimed in claim 2, said plates all having the same inner edge radii and the same outer edge radii and the spacing between one pair of adjacent plates differing from that between the next adjacent pair.

5. An antenna comprising, in combination, a source providing an omnidirectional radiation pattern in a given plane; and means for increasing the directivity of said pattern in planes perpendicular to said given plane including a plurality of parallel, spaced, annular conductive plates lying in planes parallel to said given plane, each formed with a central aperture, the edges of said plates defining the central apertures therein lying in a generally concave, continuous, cylindrical, contour surface, said source being arranged centrally in the volume included within said contour surface.

6. An antenna comprising, in combination, a source providing an omnidirectional radiation pattern in a given plane; and means for increasing the directivity of said pattern in planes perpendicular to said given plane including a plurality of spaced, parallel, aligned, annular conductive plates lying in planes parallel to said given plane, each of the same diameter, and each formed with a central aperture, the edges of said plates defining the central apertures therein lying in a generally concave, continuous, cylindrical, contour surface, and the outer edges of said plates lying in a plane, continuous, cylindrical, contour surface, said plurality of plates being concentrically arranged about said source.

7. An antenna as set forth in claim 5, and further including a first conductive surface member defining an at least approximately conical surface extending from said source to one of the end conductive plates of said plurality of plates, and a second conductive surface member defining an at least approximately conical surface extending from said source to the other end conductive plates of said plurality of plates, said conductive surface members being arranged with said surfaces in axial alignment and forming between them an electromagnetic waveguiding passage.

8. In combination, a pair of juxtaposed conductive surface members each defining an at least approximately conical surface, said members being spaced apart with said surfaces in axial alignment and forming an electromagnetic waveguiding passage between them, said passage having a continuous circular aperture; and a lens arrangement positioned in said aperture of said waveguiding passage, said arrangement including a plurality of spaced apart, parallel annular conductive plates concentric with the common axis of said surface members, each said plate being formed with a central aperture, the edges of said plates defining said central apertures lying in a generally concave, continuous, cylindrical, contour surface.

9. In the combination set forth in claim 8, the outer edges of said plates defining a plane, cylindrical, contour surface.

10. An antenna comprising waveguide transmission means formed as a pair of continuous, annular, conductive surfaces of generally biconical cross-section concentric with an axis, said means including a centrally located throat portion and an annular aperture open to free space; and a plurality of annular partition plates arranged concentric with said axis at said aperture for differentially modifying the velocity of propagation of the wave energy translated through said aperture to compensate for the effects of different path lengths traversed by components of said wave energy on the phase distribution of said energy at said apex and said aperture.

11. In combination, antenna means having an omnidirectional antenna pattern in a given plane; and means for increasing the directivity of said pattern in planes perpendicular to said given plane including a plurality of parallel, spaced, annular conductive plates lying in planes parallel to said given plane, each formed with a central aperture, the edges of said plates defining the central apertures therein lying in a contour surface, said antenna means being arranged in the volume included within said contour surface.

12. In combination, antenna means having an omnidirectional antenna pattern in a given plane; and means for increasing the directivity of said pattern in planes perpendicular to said given plane including a plurality of parallel, spaced, annular conductive plates lying in planes parallel to said given plane, each formed with a central aperture, the edges of said plates defining the central apertures therein lying in a contour surface, said antenna means being arranged centrally in the volume included within said surface.

13. In combination, antenna means having an omnidirectional antenna pattern in a given plane; and means for increasing the directivity of said pattern in planes perpendicular to said given plane including a plurality of parallel, spaced, annular conductive plates lying in planes parallel to said given plane, each formed with a central aperture, the edges of said plates defining the central apertures therein lying in a first contour surface, the outer edges of said plates lying in a plane cylindrical contour surface, and said antenna means being arranged centrally in the volume included within said first contour surface.

14. In combination, antenna means having an omnidirectional antenna pattern in a given plane; and means for increasing the directivity of said pattern in planes perpendicular to said given plane including a plurality of parallel, spaced, annular conductive plates lying in planes parallel to said given plane, each formed with a central aperture, the edges of said plates defining the central aperture lying in a generally concave, cylindrical contour surface, and the outer edges of said plates lying in a plane cylindrical contour surface, said antenna means being arranged centrally in the volume included within said concave contour surface.

References Cited in the file of this patent
UNITED STATES PATENTS
2,471,021    Bradley _____ May 24, 1949